(12) United States Patent
Enyedy

(10) Patent No.: US 9,162,313 B2
(45) Date of Patent: Oct. 20, 2015

(54) WIRE FEEDER WIRE DRIVE DESIGN

(75) Inventor: Edward Enyedy, Eastlake, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1015 days.

(21) Appl. No.: 12/978,377

(22) Filed: Dec. 23, 2010

(65) Prior Publication Data

US 2012/0160897 A1 Jun. 28, 2012

(51) Int. Cl.
| | | |
|---|---|---|
| *B23K 9/28* | (2006.01) | |
| *B23K 9/133* | (2006.01) | |
| *B21F 23/00* | (2006.01) | |
| *B23K 9/12* | (2006.01) | |
| *B23K 9/173* | (2006.01) | |
| *B65H 51/10* | (2006.01) | |

(52) U.S. Cl.
CPC .............. *B23K 9/1336* (2013.01); *B21F 23/00* (2013.01); *B23K 9/125* (2013.01); *B23K 9/173* (2013.01); *B65H 51/10* (2013.01); *B65H 2701/36* (2013.01)

(58) Field of Classification Search
CPC ...... B23K 9/125; B23K 9/1336; B23K 9/173; B23K 37/00; B23K 3/06; B65H 51/02; B65H 51/10; B65H 2701/36; B21F 23/00
USPC ....................... 219/72–75, 124.32, 136, 137.2
See application file for complete search history.

(56) References Cited

U.S. PATENT DOCUMENTS

| | | | |
|---|---|---|---|
| 3,290,480 A * | 12/1966 | Fiedler et al. ................. | 219/136 |
| 3,430,832 A | 3/1969 | Meyer | |
| 3,550,830 A * | 12/1970 | Lagogue ....................... | 226/180 |
| 3,596,041 A * | 7/1971 | Frus et al. .................... | 219/73.21 |
| 3,737,614 A * | 6/1973 | Paulange ..................... | 219/60 A |
| 3,799,215 A | 3/1974 | Willems | |
| 3,844,462 A * | 10/1974 | Tarbox et al. .................... | 226/25 |
| 3,858,779 A * | 1/1975 | Doe .............................. | 226/189 |
| 3,890,865 A * | 6/1975 | Tarbox et al. .................... | 83/198 |
| 4,172,545 A | 10/1979 | Jones et al. | |
| 4,177,912 A * | 12/1979 | Samokovliski et al. ....... | 226/176 |
| 4,214,524 A * | 7/1980 | Corse .............................. | 101/181 |
| 4,229,637 A * | 10/1980 | Dederer et al. ............ | 219/86.25 |
| 4,343,981 A * | 8/1982 | Connolly .......................... | 219/56 |
| 4,460,421 A * | 7/1984 | Booth et al. ..................... | 156/64 |
| 4,690,349 A * | 9/1987 | Yamaguchi et al. ........ | 242/420.6 |
| 5,010,816 A * | 4/1991 | Sarda ............................. | 101/228 |
| 5,045,662 A * | 9/1991 | Yamada ..................... | 219/69.12 |
| 5,302,796 A * | 4/1994 | Kuriki ........................ | 219/69.12 |
| 5,603,851 A * | 2/1997 | Noda et al. ................. | 219/69.12 |
| 5,724,847 A | 3/1998 | Hite | |
| 6,064,036 A * | 5/2000 | Kensrue ..................... | 219/137.2 |

(Continued)

FOREIGN PATENT DOCUMENTS

| | | |
|---|---|---|
| GB | 2009653 A | 6/1979 |
| WO | 2008051684 A1 | 5/2008 |

OTHER PUBLICATIONS

Magnum SG Spool Gun; Lincoln Electric; Feb. 2005; p. 16.

*Primary Examiner* — Dana Ross
*Assistant Examiner* — Renee L Miller
(74) *Attorney, Agent, or Firm* — Perkins Coie LLP

(57) ABSTRACT

A system and method of feeding wire is provided using at least one roller which is biased towards the wire. The at least one roller is permitted to deflect a limited amount during the wire feeding operation. The roller is permitted to deflect 50% or less than the wire diameter during feeding to prevent tangling.

18 Claims, 3 Drawing Sheets

(56) References Cited

U.S. PATENT DOCUMENTS

| | | | | |
|---|---|---|---|---|
| 6,066,833 | A * | 5/2000 | Rigdon et al. | 219/137.2 |
| 6,337,455 | B1 * | 1/2002 | Yamaguchi | 219/76.14 |
| 6,388,234 | B1 * | 5/2002 | Collins et al. | 219/137.7 |
| 6,427,894 | B1 * | 8/2002 | Blank et al. | 226/177 |
| 6,568,578 | B1 * | 5/2003 | Kensrue | 226/176 |
| 6,787,727 | B2 * | 9/2004 | Yamada et al. | 219/69.12 |
| 6,831,251 | B1 * | 12/2004 | Artelsmair et al. | 219/137.71 |
| 6,971,415 | B2 * | 12/2005 | Garcia et al. | 140/149 |
| 7,026,574 | B2 * | 4/2006 | Belfiore et al. | 219/137.7 |
| 7,026,575 | B2 * | 4/2006 | Wimroither | 219/137.71 |
| 7,034,250 | B2 * | 4/2006 | Kensrue | 219/137.7 |
| 7,441,682 | B2 * | 10/2008 | Kerekes et al. | 226/187 |
| 7,531,768 | B2 | 5/2009 | Matiash | |
| 7,544,914 | B2 * | 6/2009 | Zamuner | 219/137.41 |
| 7,687,742 | B2 * | 3/2010 | Belfiore et al. | 219/137.7 |
| 7,692,117 | B2 * | 4/2010 | Belfiore et al. | 219/137.7 |
| 7,748,659 | B2 | 7/2010 | Fabian | |
| 2003/0127444 | A1 * | 7/2003 | Steenis et al. | 219/137.61 |
| 2005/0103754 | A1 * | 5/2005 | Olsen | 219/121.14 |
| 2005/0224486 | A1 * | 10/2005 | Matiash | 219/137.7 |
| 2005/0224550 | A1 * | 10/2005 | Matiash | 226/181 |
| 2006/0070987 | A1 * | 4/2006 | Daniel | 219/137.71 |
| 2006/0138114 | A1 | 6/2006 | Belfiore et al. | |
| 2006/0226136 | A1 * | 10/2006 | Zamuner | 219/137.41 |
| 2006/0278624 | A1 * | 12/2006 | Christopher et al. | 219/137.7 |
| 2007/0108172 | A1 * | 5/2007 | Belfiore et al. | 219/137.7 |
| 2007/0164074 | A1 * | 7/2007 | Schorghuber et al. | 226/108 |
| 2008/0035626 | A1 | 2/2008 | Christopher et al. | |
| 2008/0067161 | A1 | 3/2008 | Spiesberger | |
| 2008/0093408 | A1 * | 4/2008 | Fabian | 226/180 |
| 2008/0217313 | A1 * | 9/2008 | Huismann et al. | 219/137.7 |

* cited by examiner

WIRE FEEDER WIRE DRIVE DESIGN

BACKGROUND OF THE INVENTION

1. Field of the Invention

Devices, systems, and methods consistent with the invention relate to an improved wire drive design for a wire feeder.

2. Description of the Related Art

During welding, such as metal inert gas (MIG) welding, a welding electrode is typically fed to a welding torch by a wire feeder. The wire feeder usually has two or more rollers which are in frictional contact with the electrode and cause the electrode to be advanced to the welding torch. In a two roller configuration, one roller is fixed positionally while the other is biased towards the electrode to provide the frictional contact with the electrode. As the electrode is delivered to the torch there can be unexpected increases in downstream frictional forces and resistance in the feeding of the wire to the torch. These increases in resistance can cause the electrode to buckle at the rollers and this buckling can overcome the biasing force applied to the rollers, ultimately resulting in the electrode becoming tangled at the rollers. This is often referred to as "birdnesting." Therefore, it is desirable to provide a wire feeder and roller configuration which inhibits or prevents this from occurring.

BRIEF SUMMARY OF THE INVENTION

An exemplary embodiment of the present invention is a wire feeder having at least one roller to be placed in frictional contact with a wire passing through the wire feeder. The roller is free to move in at least one direction normal to an axis of rotation of the roller. The wire feeder also has a supporting member supporting the roller, and a restricting portion which engages with at least one of the roller or the supporting member to limit the movement of the roller to a maximum deflection distance of G, where G is 50% or less of the diameter of the wire.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
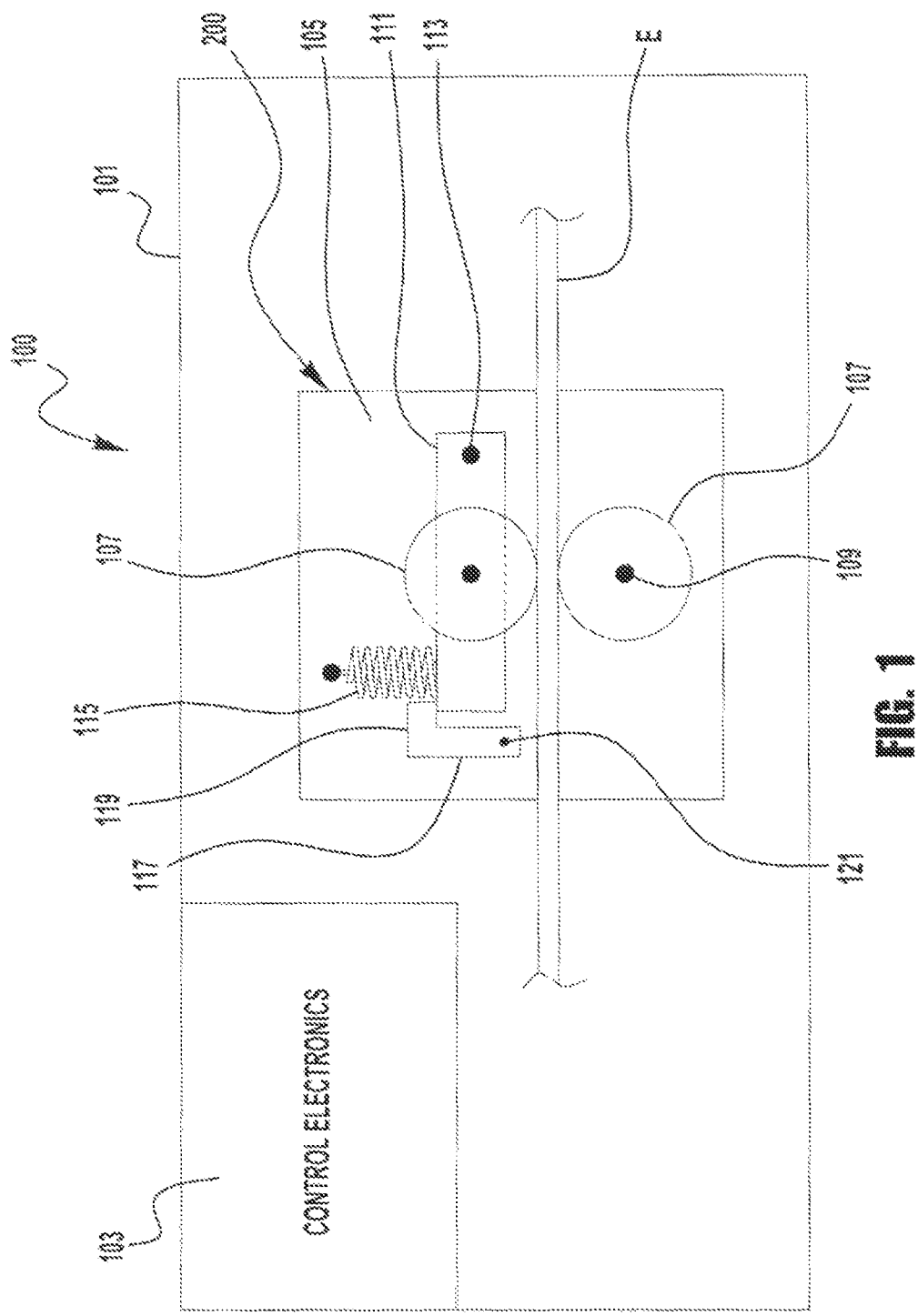
FIG. 1 illustrates a diagrammatical representation of a wire feeder incorporating an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 is a representative diagrammatical representation of wire feeder 100 incorporating aspects of the present invention. Specifically, the wire feeder 100 has a housing 101, of any suitable construction, control electronics 103 and a wire roller module 200. The control electronics 103 of the wire feeder 100 are electronics used to control the operation and functionality of the wire feeder 100 and a drive motor (not shown) within the wire feeder 100 which drives at least one, if not all, of the rollers 107. Because these electronics are known by those of skill in the art, the electronics will not discussed in detail herein.

Figure 2:
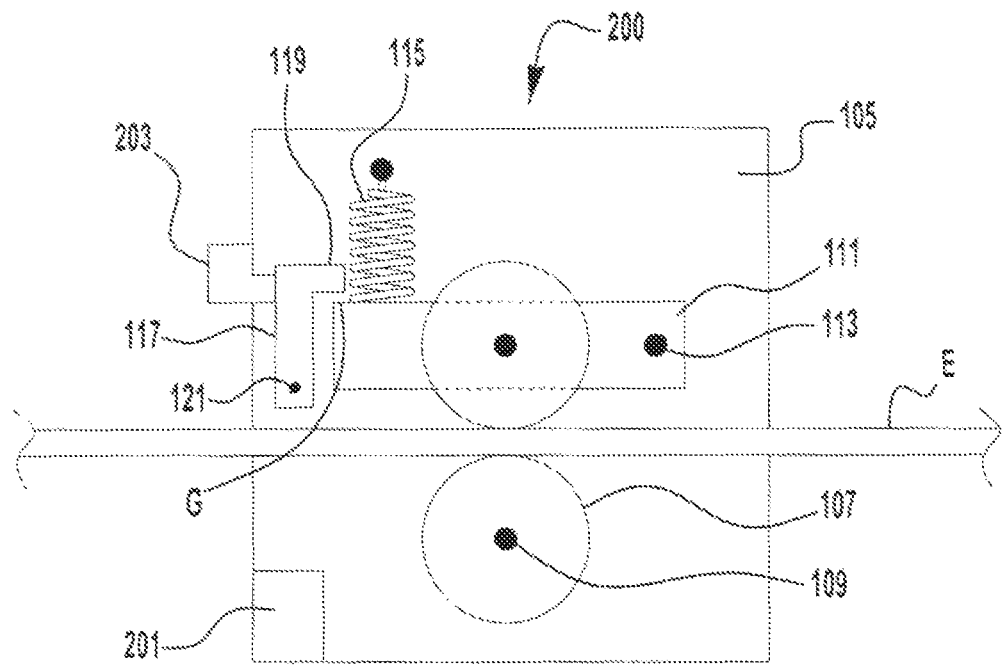
FIG. 2 illustrates a diagrammatical representation of an exemplary embodiment of the present invention.

Within the wire feeder 100 is a wire roller module 200 (also shown in FIG. 2). The module 200 has a support structure 105 upon which at least two wire rollers 107 are mounted. Although the depicted module only depicts two rollers 107, the present invention is not limited to such a configuration, and can be used in embodiments using as few as one roller, or more than two rollers. For example, embodiments of the present invention can be used with a four roller configuration. In the exemplary embodiment shown in FIGS. 1 and 2, the bottom roller 107 is fixedly mounted to the support structure 105 with its shaft 109. Thus, the roller 107 is free to rotate (or can be driven by a motor) its vertical and horizontal positioning relative to the support structure is fixed. However, the upper roller 107 is mounted to a pivot arm 111 which is also secured to the support structure 105 with a pivot shaft 113. Thus, the pivot arm 111 can freely rotate about the shaft 113 allowing the upper roller 107 to be moved away from the electrode E. A biasing member 115, which can be a spring or other biasing type device, provides a biasing force onto the pivot arm 111 and/or the upper roller 107 so as to apply a squeezing force onto the wire. This squeezing force increases the friction between the rollers 107 and the electrode E to aid in driving the electrode E to a welding torch.

Also coupled to the support 105 is a restricting member 117 which has a restricting portion 119. The restricting member 117 is pivotally secured to the support 105 with the pivot 121. With this structure the restricting portion 119 engages with the pivot arm 111 to restrict the movement of the pivot arm during the wire feeding operation. As explained previously, during operation it is possible that resistance in the feeding of the electrode E can cause the compression forces in the electrode E to exceed its columnar strength and cause buckling. This buckling causes the electrode E to exceed the bias strength of the biasing member 115 and move the upper roller 107 far enough away from the lower roller 107 so that the electrode will tangle within the wire feeder 100. However, in this exemplary embodiment of the present invention the restraining portion 119 engages with the pivot arm 111 and prevents the pivot arm 111, and thus the upper roller 107, from moving too far away from the lower roller 107. This restriction aids in preventing the above described tangling from occurring. Specifically, by restraining the upper roller 107, embodiments of the present invention provide additional support to the electrode E to inhibit buckling.

As shown in FIG. 2, embodiments of the present invention have a gap G between the restraining portion 119 and the pivot arm 111 during normal operation. This gap G is to prevent the restraining portion 119 and member 117 from exerting excessive force onto the electrode E during operation—to avoid crushing the electrode E. During normal operation the biasing member 115 provides sufficient force for proper operation of the rollers. However, if the electrode E begins to buckle and push against the upper roller 107, the pivot arm 111 will only deflect for the distance of the gap G and will prevent the buckling and tangling described above.

In an exemplary embodiment of the present invention, the gap G is 50% or less than the diameter of the electrode E. In a further exemplary embodiment of the present invention, the gap G is 5% or less than the diameter of the electrode. This ensures that the upper roller 107 has sufficient deflection for normal operation but will not deflect so as to permit the electrode E to buckle.

During operation, when an electrode E is to be inserted into the wire feeder 100 the restraining member 117 is pivoted away from the pivot arm 111 so that the upper roller 107 can be moved sufficiently to allow the electrode E to be properly positioned between the rollers 107. The biasing member 115 will maintain contact between the rollers 107 and the electrode E during operation. Once the electrode E is positioned the restraining member 117 is positioned such that the restraining portion 119 is positioned to create the gap G with the pivot arm 111. This positioning is maintained during normal operation of the wire feeder 100 so that tangling of the electrode E is reduced or eliminated.

In another exemplary embodiment, the restraining member 119 and/or the restraining portion 119 can have a flexible spacer (not shown in FIG. 2) which bridges the gap G when the restraining member 119 is moved into its operational position. In this embodiment the spacer can provide additional biasing force, but is flexible to allow for at least some deflection of the upper roller 107 during operation.

In another exemplary embodiment of the present invention, the module 200 is easily removable and replaceable as an entire unit. In many existing wire feeders when the rollers are worn or need to be replaced because different electrode diameters are being used, it is necessary to remove and replace the rollers, which can be a cumbersome and time consuming process. However, with the modular aspects of the present invention, the module 200, including its components, such as the support 105, rollers 107, etc. can be replaced as a single unit easily. Thus, when the rollers 107 need to be replaced, for whatever reason, the module 200 can be easily replaced.

In a further exemplary embodiment, the module 200 contains an identifier 201. The identifier 201 identifies the module 200 to the wire feeder assembly 100, so that wire feeder 100 recognizes the electrode sizing of the rollers 107. For example, if the wire feeder 100 is to be use for a 0.045 inch electrode, the identifier 201 would identify to the wire feeder 100 that the module 200 is for 0.045 inch wire. In an exemplary embodiment, the wire feeder 100 and its control electronics can display information related to the module 200 on a display screen (not shown) of the wire feeder 100. For example, the display screen can show the electrode diameter that the module 200 was designed for. Further, the control electronics can also display an error code if an incorrect module 200 is installed.

For example, if an operator desires to weld with a 0.045 inch electrode the operator inputs this information into the wire feeder controls (not shown). If the wrong module 200 is installed in the wire feeder 100 then an error or warning message will be displayed indicating to the operator that the wrong module 200 is installed. Similarly, if during a welding operation the module 200 needs to be replaced (because of wear) an error message would be shown if the wrong module 200 was placed in the wire feeder. In alternative embodiment, the control electronics would prevent operation of the wire feeder 100 until the proper module 200 was installed.

The identifier 201 can be any identifying mechanism which identifies characteristics of the module 200, such as electrode diameter, to the wire feeder 100. For example, the identifier 201 can be an RFID type tag, a bar code tag, or any other type of identifying component. The use of this technology is well known and understood and will not be discussed in detail herein.

In another exemplary embodiment, the module 200 contains a shut-off switch 203 which is coupled to the wire feeder 100 control electronics. The shut-off switch 203 can be a pressure switch or an electronic switch, which is activated if the arm 117 is moved past a threshold point. Specifically, if, during operation, the arm 117 is not in a proper position or is inadvertently moved during operation the switch 203 would shut-off operation of the wire feeder 100.

Figure 3:
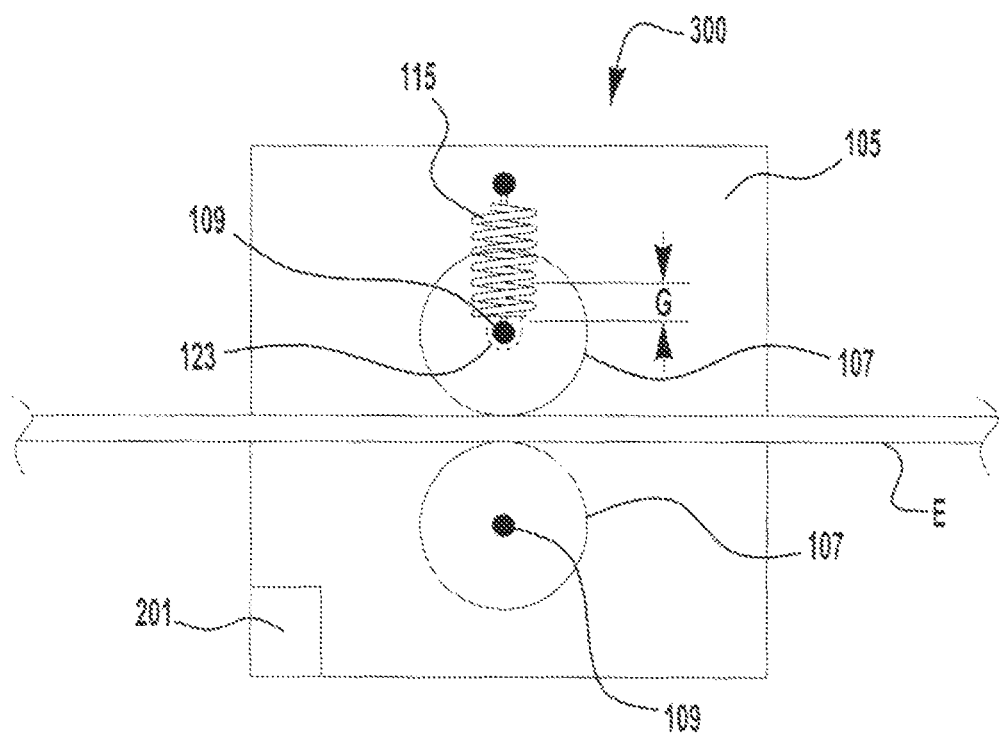
FIG. 3 illustrates a diagrammatical representation of a further exemplary embodiment of the present invention.

FIG. 3 depicts a further exemplary embodiment of a module 300 in accordance with the present invention. In this exemplary embodiment, at least one of the rollers 107 is mounted to a shaft 109 which passes through an elongated or slotted groove 123 in the support 105 (or similar structure). During operation a biasing member 115, also coupled to the shaft 109, biases the upper roller 107 so as to provide the proper amount of frictional force to the electrode E for operation. However, because of the elongated hole 123 the upper roller 107 travel vertically a distance G. As explained previously, the distance G can be 50% or less of the diameter of the electrode, and in another embodiment is 5% or less of the diameter of the electrode E. Similar to the discussion above, the elongated hole 123 prevents the upper roller 107 from traveling too far, vertically, if an electrode E tangle occurs. In another exemplary embodiment of the present invention, the bottom roller 107 is also engaged with an elongated hole 123. In such an embodiment, the distance G is divided the two rollers, such that each of the rollers 107 can move to accommodate the electrode E and any operational anomalies, but the rollers 107 would not move away from each other by more than the distance G.

Figure 4:
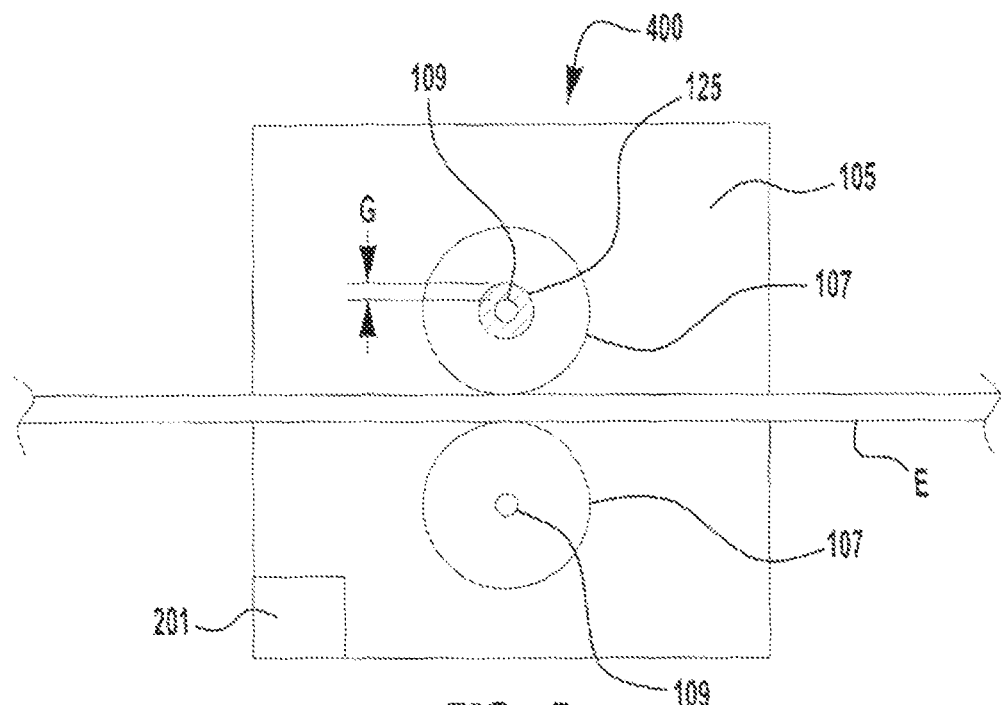
FIG. 4 illustrates a diagrammatical representation of an additional exemplary embodiment of the present invention.

FIG. 4 depicts yet another exemplary embodiment of the present invention. In this embodiment the shaft 109 of the upper roller 107 is secured to the structure 105 with a flexible o-ring or grommet 125. The grommet 125 is made from a stiff but flexible material, such as rubber, for example, which is capable of deforming under a load. Similar to the embodiments described above, during operation the grommet 125 can compress, but no more than the gap distance G discussed above. In an exemplary embodiment of the present invention, the grommet 125, shaft 109, structure 105 and rollers 107 are designed such that there is at least some biasing of the rollers 107 against the electrode E during normal operation so as to provide the necessary frictional forces. Further, if a tangle occurs, or some other anomaly, the roller 107 can deflect the distance G because of the flexibility of the grommet. However, the grommet 125, roller 107, shaft 109 and support 105 are designed such that the maximum displacement of the roller 107 is the gap distance G. Further, as discussed above with respect to FIG. 3, in this embodiment, both rollers 107 can use a grommet 125 to provide the desired bias and displacement.

It is noted that the present invention is not limited to the specific embodiments described above and shown in FIGS. 1 through 4. Specifically, other types of components and configurations can be used to provide the desired compressive force between the rollers (to effect proper driving of the electrode E) and limit the movement of the rollers as described above. For example, V-springs, helical springs, canted coil springs, or other types of biasing components, can be used.

Figure 5:
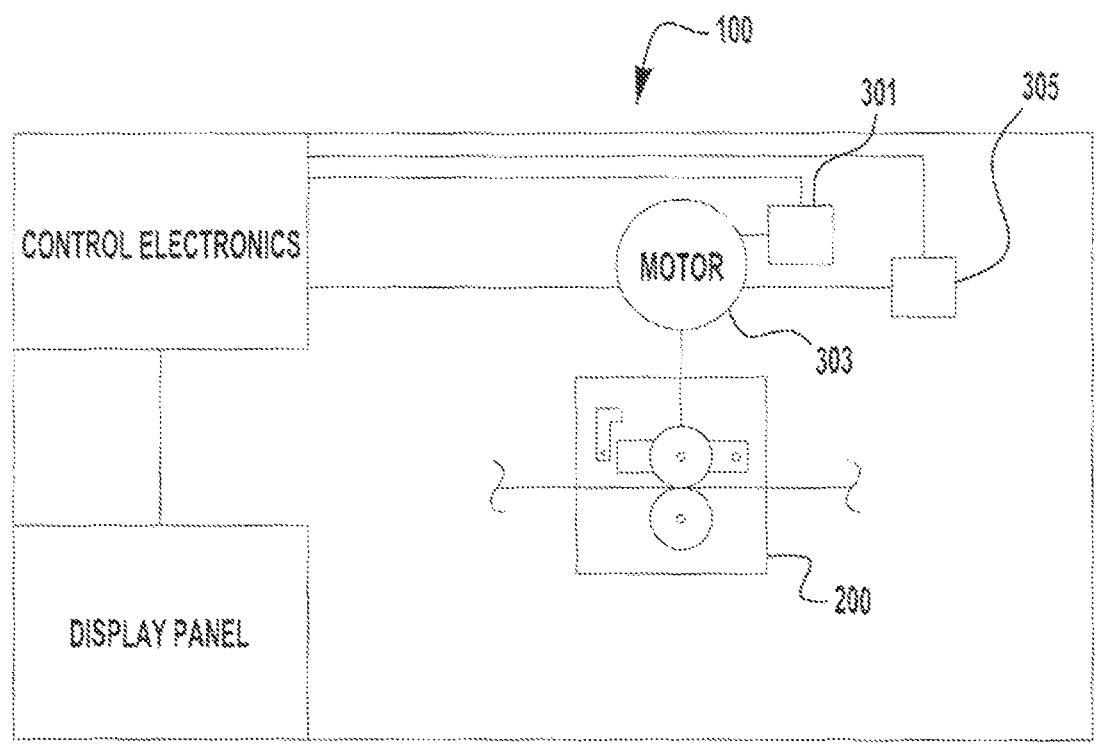
FIG. 5 illustrates a diagrammatical representation of a wire feeding system in accordance with an exemplary embodiment of the present invention.

In a further exemplary embodiment, shown in FIG. 5, a torque sensor 301, or similar device, is coupled to the drive motor 303 to measure the torque being applied by the motor 303 to the roller 107. The torque sensor 301 is also coupled to the control electronics of the wire feeder 100 such that when the sensed torque on the motor 303 driving the roller 107 exceeds a threshold amount the control electronics stops operation of the wire feeder 100 to prevent tangling. When an electrode E begins to tangle in the wire feeder 100 there can be a rapid increase in the torque load in the motor 303 through the rollers 107, which are trying to drive the electrode E. The control electronics recognizes this increase in the torque load as the beginning of a tangle and executes an emergency stop of the wire feeder 100. In other embodiments a warning signal can be displayed on a display panel. Further, the shut down can be also communicated to other systems, such as a power supply, computer, etc. which is coupled to the wire feeder 100, such as in a welding network or robotic welding cell. In other exemplary embodiments, the control electronics of the wire feeder 100 monitors the current and/or power of the motor 303 vie the use of a current and/or power sensor device or circuit 305 to determine of a tangle is occurring. Specifically, similar to the discussion above, as a tangle occurs the current and power in the motor 303 increases. Thus, the control electronics monitors the motor current and/or power and if either or both exceed a threshold, indicating the beginning of a tangle, then the control electronics signals the motor 303 to stop operation and/or provide a warning or error signal to an operator, for example through a display panel. The present invention is not limited by the circuitry, electronics and systems employed to monitor the motor torque, current and/or power as any know sensing mechanism or circuitry can be employed to provide the control electronics the desired feedback. Moreover, the torque, current and/or power threshold level employed by the control electronics to determine if a tangle has occurred can be either preset into the control electronics, or can be a function of the module 200 employed in the wire feeder.

Specifically, as described above the module 200 can have an identifier 201. In an exemplary embodiment, when the identifier 201 identifies the module 200 to the control electronics of the wire feeder 100 the control electronics changes the threshold level of the torque, current and/or power based on the module 200. For example, it is contemplated that the threshold level changes for different wire diameters, and the control electronics appropriately selects the desired threshold level based on the diameter of the electrode to be used in the welding operation. The control electronics can receive the electrode diameter information from either the user entry of the information, or from the identifier 201 associated with the module 200.

It is noted that the present invention is not limited by the type of welding electrode to be utilized or the type of welding operation, but can be used in many different types of welding operations with many different types of welding electrodes and electrode combinations. Further, embodiments of the present invention are not limited to the welding industry, but can be used with any wire feeding operation where tangling during feeding can be an issue.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A wire feeder, comprising:
    at least one roller be placed in frictional contact With a wire passing through said wire feeder, where said at least one roller is free to move in at least one direction normal to an axis of rotation of said at least one roller;
    a supporting member supporting said at least one roller; and a restricting portion which engages with at least one of said at least one roller or said supporting member to limit the movement of said at least one roller in said at least one direction to a maximum deflection distance of G where G is 50% or less of a diameter of the wire;
    at least one additional roller to be placed in frictional contact with said wire; and
    a biasing member which provides a biasing force to at least one of said supporting member or said at least one roller to bias said at least one roller into contact with said wire; and
    a switching mechanism which stops operation of said wire feeder based on said movement of said at least one roller exceeding a threshold distance,
    wherein said at least one roller and said at least one additional roller drive said wire to a welding torch, and
    wherein said biasing member increases said frictional contact between said at least one roller and said wire to aid in said driving of said wire.

2. The wire feeder of claim 1, wherein G is 5% or less of the diameter of the wire.

3. The wire feeder of claim 1, wherein said supporting member is a pivotable support structure.

4. The wire feeder of claim 1, further comprising a biasing member which provides a biasing force to at least one of said supporting member or said at least one roller to bias said at least one roller into contact with said wire.

5. The wire feeder of claim 1, wherein each of said at least one roller, said supporting member and said restricting portion are secured to a module structure which is removable from said wire feeder.

6. The wire feeder of claim 5, wherein said module structure further comprises an identifier which identifies at least one parameter of said module structure to said wire feeder.

7. The wire feeder of claim 1, wherein said restricting portion comprises a flexible member.

8. The wire feeder of claim 1, wherein said biasing member is a spring.

9. The wire feeder of claim 8, wherein said spring is one of a V-spring, a helical spring, and a canted coil spring.

10. A wire feeding module, comprising:
    at least one roller to be placed in frictional contact with a wire, where said at least one roller is free to move in at least one direction normal to an axis of rotation of said at least one roller; a supporting member supporting said at least one roller; a restricting portion which engages with at least one of said at least one roller or said supporting member to limit the movement of said at least one roller in said at least one direction to a maximum deflection distance of G, where G is 50% or less of a diameter of the wire;
    at least one additional roller to be placed in frictional contact with said wire; and a biasing member which provides a biasing force to at least one of said supporting member or said at least one roller to bias said at least one roller into contact with said wire; and
    a switching mechanism which stops operation of a wire feeder based on said movement of said at least one roller exceeding a threshold distance,
    wherein said at least one roller and said at least one additional roller drive said wire to a welding torch, and
    wherein said biasing member increases said frictional contact between said at least one roller and said wire to aid in said driving of said wire.

11. The wire feeder module of claim 10, wherein G is 5% or less of the diameter of the wire.

12. The wire feeder module of claim 10, wherein said supporting member is a pivotable support structure.

13. The wire feeder module of claim 10, further comprising a biasing member which provides a biasing force to at least one of said supporting member or said at least one roller to bias said at least one roller into contact with said wire.

14. The wire feeder module of claim 10, wherein each of said at least one roller, said supporting member and said restricting portion are secured to a module structure which is insertable and removable from a wire feeder assembly.

15. The wire feeder module of claim 10, wherein said module further comprises an identifier which identifies at least one parameter of said module to a wire feeder.

16. The wire feeder module of claim 10, wherein said restricting portion comprises a flexible member.

17. The wire feeder module of claim 10, wherein said biasing member is a spring.

18. The wire feeder of claim 17, wherein said spring is one of a V-spring, a helical spring, and a canted coil spring.

* * * * *